United States Patent

[11] 3,610,886

[72] Inventors Nelson J. Pansing
  Clayton, Ohio;
  Donald C. Siegla, Utica, Mich.
[21] Appl. No. 54,993
[22] Filed July 15, 1970
[45] Patented Oct. 5, 1971
[73] Assignee General Motors Corporation
  Detroit, Mich.

[54] POWER DIVIDER CIRCUIT FOR TWO-UNIT HOTPLATE
  3 Claims, 3 Drawing Figs.
[52] U.S. Cl. .................................................. 219/486
[51] Int. Cl. ................................................... H05b 1/02
[50] Field of Search ...................................... 219/485, 486, 501; 307/41

[56] References Cited
  UNITED STATES PATENTS
  3,180,999 4/1965 Kuykendall .................. 219/486
  3,335,319 8/1967 Warner ........................ 307/41

Primary Examiner—Bernard A. Gilheany
Assistant Examiner—F. E. Bell
Attorneys—W. S. Pettigrew, J. C. Evans and K. H. MacLean, Jr.

ABSTRACT: In preferred form, an electric hotplate with dual resistance-type heating elements which produce a maximum power output at a predetermined current level when operated separately. When operated simultaneously, the current is divided between the elements to energize them at less than the maximum power output without exceeding the predetermined current level. The hotplate circuit includes two parallel branches each containing a heating element, a heat control switch and a diode for energizing one element with the positive half wave of alternating current and the other element with the negative half wave of alternating current. A current-responsive bypass circuit which is normally in parallel with the diodes opens when both elements are energized simultaneously.

PATENTED OCT 5 1971
3,610,886
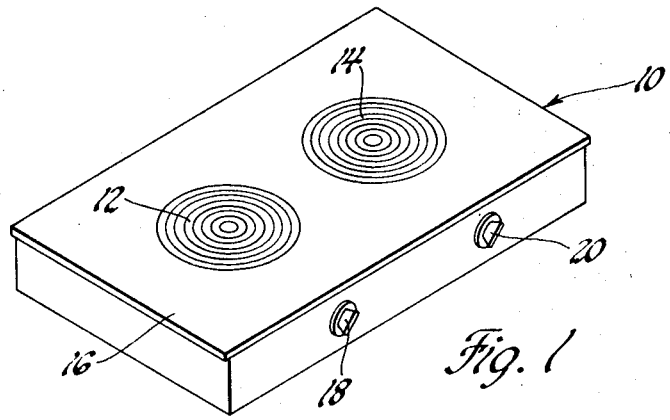
Fig. 1
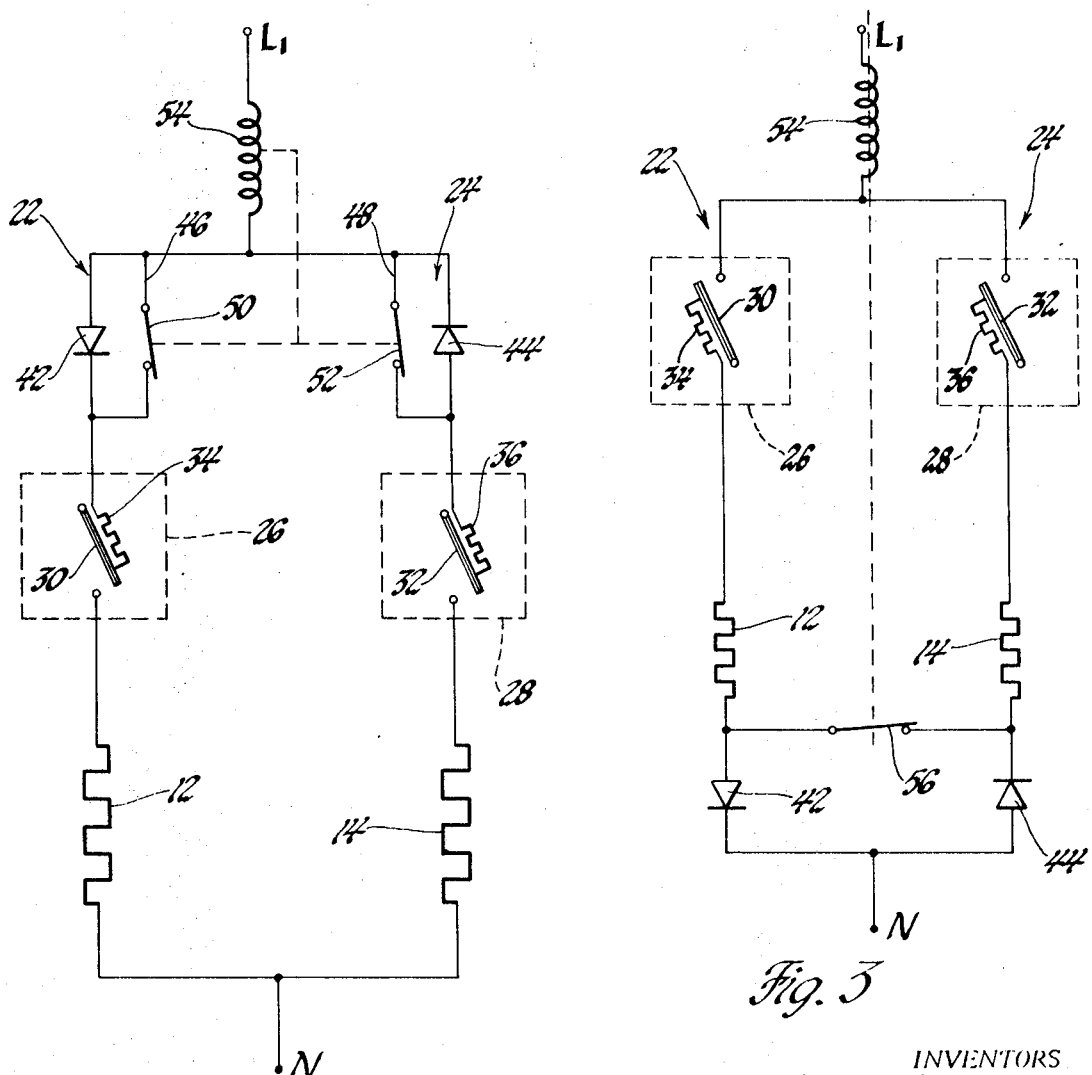
Fig. 2
Fig. 3
INVENTORS
Nelson J. Pansing &
BY Donald C. Siegla
K. H. MacLean, Jr.
ATTORNEY

POWER DIVIDER CIRCUIT FOR TWO-UNIT HOTPLATE

This invention relates to an electric hotplate having dual resistance-type heating elements.

When two-element hotplates are operated on a 118-volt domestic alternating current source, they are commonly limited to a maximum 15-ampere current. Thus, the wattage of each surface element must not exceed about 885 watts so as to draw less than the maximum current whenever both elements are on simultaneously. Normally this is not a serious disadvantage because usually only 885 watts are needed. However, when a large quantity of water must be boiled, a higher wattage element is desirable.

The subject hotplate includes two resistance elements each having a 1,770-watt power output. Obviously, both elements may not be operated at this power level simultaneously without exceeding 15 amperes. The hotplate circuit includes two parallel branches each containing one 1,770-watt resistance element, a heat control switch, and a diode in series. When the elements are energized simultaneously, the diodes pass the positive half wave of alternating current to one resistance element and the negative half wave to the other resistance element. A normally closed bypass circuit prevents the current division and energizes one element at maximum power when only one of the elements is active. This bypass circuit is opened in response to a predetermined maximum current.

Therefore, an object of the inventor in the present invention is to provide a two-element hotplate which generates maximum power output from one element at a predetermined maximum current when only one element is active but which operates with both units active without exceeding the maximum current.

A further object of the inventor in the present invention is to provide a two-element hotplate in which a circuit having diodes apportions the positive half wave of alternating current to one element and the negative half wave to the other element.

Further objects and advantages of the present invention will be apparent from the following description, reference being had to the accompanying drawings wherein a preferred embodiment of the present invention is clearly shown.

IN THE DRAWINGS

FIG. 1 is a perspective view of a domestic two-element hotplate;

FIG. 2 is a circuit diagram for the hotplate shown in FIG. 1;

FIG. 3 is another circuit diagram of a second embodiment of the hotplate shown in FIG. 1.

In FIG. 1 of the drawings, a domestic hotplate 10 is illustrated. The hot plate 10 includes two surface resistance elements 12 and 14 supported in a boxlike frame 16. Dials 18 and 20 regulate the energization of elements 12 and 14.

A circuit for hotplate 10 is illustrated in FIG. 2. The elements 12 and 14 are connected in parallel branches 22 and 24 of the circuit which extends between supply conductors L1 and L2. In branches 22 and 24, the resistance elements 12 and 14 are in series with infinite heat switches 26 and 28. The heat switches 26 and 28 include bimetal arms 30 and 32 which move in response to heat generated by switch resistance coils 34 and 36 to alternately make and break the circuit. The resistors 34 and 36 are in series with the elements 12 and 14. Dials 18 and 20 are operably connected to the switches 26 and 28. Cams (not shown) rotated by the dials 18 and 20 adjust the position of the bimetal arms 30 and 32 to alternately energize and deenergize the elements 12 and 14 so as to control their energization.

The input lead from L1 to switches 26 and 28 extends through diodes 42 and 44. These diodes 42 and 44 are connected in the polarity shown to energize one of the resistance elements with the positive half wave of the alternating current and to energize the other of the resistance elements with the negative half wave of alternating current when both elements are active.

Bypass circuits 46 and 48 in FIG. 2 extend around the diodes 42 and 44 respectively. The bypass circuits include normally closed switches 50 and 52 which conduct current around the diodes to energize either resistance element 12 or 14 at full power when only one element is active. Switches 50 and 52 can be opened to cause current to flow through the diodes 42 and 44 when both resistance elements are active. The switches 50 and 52 are opened in response to a predetermined current in a solenoid coil 54. When only one of the resistance elements 12 and 14 is energized by a switch 26 or 28, the switches 50 and 52 are closed to fully energize the active element. However, when both elements 12 and 14 are energized by the heat switches 26 and 28, the initial current through solenoid 54 opens the switches 50 and 52 to cause the current to flow through diodes 42 and 44. The diodes divide the current between the two elements 12 and 14 as previously explained.

The circuit shown in FIG. 3 is similar to that in FIG. 2 but with a single switch 56 substituted for the switches 50 and 52. When only one of the elements 12 and 14 is active, current flows from L1 through the active element and through both diodes 42 and 44 by means of the closed switch 56. In this way, the active element is energized at maximum current. When both elements 12 and 14 are activated by switches 26 and 28, the switch 56 is opened in response to current through the solenoid coil 54. The current then passes through both branches 22 and 24, through the elements 12 and 14 and through diodes 42 and 44. These diodes 42 and 44 divide the alternating current wave between the elements 12 and 14.

For example, prior two-element hotplates were limited to dual 885-watt elements in parallel for use with the common 118-volt AC current source. This limited the current to 15 amperes which is commonly the maximum for most household wiring circuits. The subject dual-element hotplate has been tested with dual 1,770-watt resistance elements in parallel. When activated separately, a maximum power was produced. When activated simultaneously, they do not draw more than 15 amperes. A solenoid in series with the elements is used which will pull in at approximately 17 amps. At this current the switches 50 and 52 or 56 are opened. A desirable drop out current for the solenoid is approximately 8 amps which closes switches 50 and 52 or 56. The 17 amps pull in was selected to prevent solenoid operation due only to transient power surges when the hotplate is first turned on. However, when both elements of the hotplate are activated at full power, the current rapidly exceeds 17 amps and the solenoid is operated to open the switches 50 and 52 or 56.

While the embodiments of the present invention as herein described constitute preferred forms, it is to be understood that other forms may be adapted.

What is claimed is as follows:

1. An electric hotplate having two resistance elements comprising: circuit means including parallel branches connected across an alternating current source; one resistance element in each of said parallel branches for generating resistance heat; switch means in series with each resistance element for selectively activating said resistance elements simultaneously or individually; a diode in each of said parallel branches in series with said resistance elements; said diodes connected in opposite polarity to one another to pass the positive half wave of alternating current to one resistance element and the negative half wave to the other resistance element when both resistance elements are active; means for bypassing said diodes and passing full wave alternating current to one resistance element when the other resistance element is inactivated by said selective switch means.

2. An electric hotplate having two resistance elements comprising: circuit means including parallel branches connected across an alternating current source; one resistance element in each of said parallel branches for generating resistance heat; switch means in series with each resistance element for selectively activating said resistance elements simultaneously or individually; a diode in each of said parallel branches in series with said resistance elements; said diodes connected in opposite polarity to one another to pass the positive half wave of alternating current to one resistance element and the negative half wave to the other resistance element when both resistance elements are active; bypass circuit means in parallel with said diodes for passing current around said diodes and through one resistance element when only the one resistance element is activated by said manual switch means; normally closed switches in said bypass circuit means which may be opened to cause current to flow through said diodes; a current-responsive solenoid operably connected to said normally closed switches to open said switches whenever a predetermined current is exceeded.

3. An electric hotplate having two resistance elements comprising: circuit means including parallel branches connected across an alternating current source; one resistance element in each of said parallel branches for generating resistance heat; switch means in series with each resistance element for selectively activating said resistance elements simultaneously or individually; a diode in each of said parallel branches in series with said resistance elements; said diodes connected in opposite polarity to one another to pass the positive half wave of alternating current to one resistance element and the negative half wave to the other resistance element when both resistance elements are active; bypass circuit means between said parallel branches for interconnecting said diodes to pass full wave alternating current through one resistance element and both of said diodes when only the one resistance element is activated by said manual switch means; a normally closed switch in said bypass circuit means which may be opened when both resistance elements are active to cause current from one resistance element to flow through one diode and current from the other resistance element to flow through the other diode; a current-responsive solenoid operably connected to said normally closed switch to open said switch whenever a predetermined current is exceeded.